(12) United States Patent
Lu et al.

(10) Patent No.: US 11,084,961 B2
(45) Date of Patent: Aug. 10, 2021

(54) HIGHLY FLAME-RETARDANT ADHESIVE FOR HIGH POLYMER MATERIALS

(71) Applicant: SHANDONG UNIVERSITY, Jinan (CN)

(72) Inventors: Haifeng Lu, Jinan (CN); Chuanjian Zhou, Jinan (CN); Hua Wang, Jinan (CN); Shengyu Feng, Jinan (CN); Chen An, Jinan (CN); Yuan Qu, Jinan (CN); Fanzhen Kong, Jinan (CN); Qingming Zeng, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/203,505

(22) Filed: Mar. 16, 2021

(65) Prior Publication Data
US 2021/0198542 A1    Jul. 1, 2021

(30) Foreign Application Priority Data

Dec. 9, 2020 (CN) .......................... 202011426403.4

(51) Int. Cl.
| | |
|---|---|
| *C09J 179/04* | (2006.01) |
| *C09J 11/06* | (2006.01) |
| *C09J 11/08* | (2006.01) |
| *C08K 5/53* | (2006.01) |
| *C08K 3/04* | (2006.01) |
| *C08K 5/5445* | (2006.01) |
| *C08K 9/06* | (2006.01) |

(52) U.S. Cl.
CPC .............. *C09J 179/04* (2013.01); *C08K 3/04* (2013.01); *C08K 5/53* (2013.01); *C08K 5/5445* (2021.01); *C08K 9/06* (2013.01)

(58) Field of Classification Search
CPC . C09J 179/04; C09J 11/06; C09J 11/08; C09J 9/6574
USPC ......................................... 523/209
See application file for complete search history.

(56) References Cited

U.S. PATENT DOCUMENTS

2018/0362815 A1* 12/2018 Yane ........................ C09J 7/30

* cited by examiner

*Primary Examiner* — Deve V Hall
(74) *Attorney, Agent, or Firm* — CBM Patent Consulting, LLC

(57) ABSTRACT

This invention relates to a highly flame-retardant adhesive for high-polymer materials. The adhesive contains a phenolic hydroxyl flame retardant which is prepared from organic amino compounds by one-step reaction with simple and controllable synthesis conditions and high synthesis efficiency; and then the highly flame-retardant adhesive can be obtained by blending the flame-retardant and the adhesive. The highly flame-retardant adhesive synthesized in the invention can be directly used as an adhesive for polymer materials to produce high adhesion strength, or used as a basic formula and prepared into composite adhesives through the addition of other fillers, or used as a primer agent to modify surfaces of polymer materials, so as to meet different needs on various special occasions.

15 Claims, 4 Drawing Sheets

HIGHLY FLAME-RETARDANT ADHESIVE FOR HIGH POLYMER MATERIALS

This application claims priority to Chinese Patent Application Ser. No. CN202011426403.4 filed on 9 Dec. 2020.

TECHNICAL FIELD

This invention relates to a highly flame-retardant adhesive for high polymer materials and belongs to the technical field of high polymer material preparation and application.

BACKGROUND ART

Fires do great harm to people's lives and properties. Therefore, flame-retardant materials have attracted a lot of attention because they can prevent a fire or buy people precious time to escape when a fire breaks out. At present, the research on high polymer fire-retardant materials mainly focuses on structural materials, such as fire-retardant sheets, fire-retardant cables and fire-retardant pipes, etc., and few reports are available on fire-retardant adhesives. In the event of a fire, it is not enough that only the structural materials are fire-retardant. If adhesives at joints of structural materials are not flame-retardant, the fire will burn along the seams or even spread internally through the seams. Therefore, adhesives with flame-retardant properties will be an effective supplement to the current flame-retardant structural materials and researches on them are of great significance.

At present, the main method to improve the fire retardance of adhesives is to add flame retardants to adhesives, and three major types of flame retardants are commonly used, respectively inorganic flame retardants, organic flame retardants, and organic-inorganic compound flame retardants.

The commonly used inorganic flame retardants, such as magnesium hydroxides, aluminum hydroxides, layered double hydroxides, titanium dioxides and other metal oxides/metal hydroxides, have advantages of high melting point, simple preparation process and good flame-retardant performance. For example, the patent CN111572144A has disclosed a fire-retardant synthetic leather substrate sofa fabric, in which several filler through-holes arranged in the middle part of the composite pearl wool layer contained in the fabric are filled with aluminum hydroxides as the inorganic flame-retardant adhesives, so as to allow the modified fabric to be flame-retardant. The patent CN111454558A has disclosed a preparation method of flame-retardant and smoke suppression socket materials, in which the mixtures of polyethylene wax compounds, polycarbonates and magnesium hydroxides are added and melted in a double-screw extruder for extrusion granulation. The socket material obtained has excellent flame-retardant and smoke suppression performance, which greatly improves electrical safety. The patent CN102056979A has disclosed a kind of flame-retardant polymer mixture, in which the components include: (A) At least one polar olefin polymer containing one or more comonomer units based on (methyl)-acrylates and/or (methyl)—crylic acids; (B) A compound containing silicon groups; and (C) Titanium dioxides, inorganic fillers that are neither hydroxides nor a basically hydrated compound, wherein the content of the said inorganic fillers is 46-70 wt % of the total amount of the said polymers. This composition has been used to produce lines and cables.

Commonly used organic flame retardants include halogen flame retardants and halogen-free flame retardants, the former of which are widely used because of their good compatibility with polymer materials and huge annual output. The flame-retardant mechanism of halogen flame retardants is that flame-retardant materials release free halogen radicals and hydrogen hydrides during combustion; halogen radicals bind to active radicals, hydrogen radicals and hydroxyl radicals to prevent the combustion chain reaction and reduce or even stop the combustion process by producing less active free radicals. The patent CN111286163A has disclosed an enhanced flame-retardant low warpage PBT alloy material and its preparation method. Due to the addition of mixtures of brominated flame retardants and antimony-based synergistic flame retardants, the material is rated V-0 in the UL-94 g test, and the good fire-retardant property allows its application scope expansion in high-grade electrical components, housings of large appliances and other fields. The patent CN111225947A has disclosed a halogen-containing flame-retardant polyamide composition; the addition of diphenylethane (pentabromophenyl) flame retardants makes the flame retardance performance of this material significantly higher than that of conventional polyamide compositions: the unfilled PA66 composition shows the best performance of V-0 level (960° C., under all experimental thicknesses) in the glow-wire test. As for halogen-free flame-retardant materials, most studies focus on organic phosphine salts at present. For example, the patent CN111621125A has disclosed a high-performance enhanced flame-retardant PBT engineering material without halogens and red phosphori and its preparation method. In the material, the halogen-free flame retardants and flame-retardant synergists play the flame-retardant function, the former of which are phosphinic salts and the latter are melamine polyphosphates. This material has better smoke density test values and effects than those of commercially available enhanced halogen-free flame-retardant PBT materials and equivalent or better mechanical property than that of enhanced glass-fiber brominated or antimony-based flame-retardant PBT materials and can substitute halogen-containing materials in the PBT field. The patent CN111662538A has disclosed an enhanced low-smoke-density high-performance halogen-free flame-retardant PBT composite and its preparation method. Mixtures of organic phosphinic aluminum and melamine polyphosphates are used as halogen-free flame-retardant compounds, and the MCA, molybdates and reactive smoke suppressants are added individually or simultaneously to study the effect of smoke suppression and flame retardance. It is concluded that under the action of the three kinds of smoke suppressants, the smoke density is Dsmax≤200 which can meet the smoke density level 2 or above as required by EN45545-2 (namely, the smoke density of Dsmax≤300 as tested according to ISO5659-2), and the mechanical property reaches a higher level.

In order to get flame retardants with flame resistance, smoke suppression and low toxicity, and considering the requirements of workability, material compatibility and environmental protection, more and more attention has been paid to the organic-inorganic flame-retardant system using nano-particles as a new type of filler. The flame-retardant mechanism of nanometer materials is that in the combustion process, a silicon carbon protective layer will be formed on the surface of the polymer substrate after the material cracking, which will serve as a barrier to prevent the mass and heat transfer, so that the substrate does not burn in a large area. The patent CN111592825A has disclosed an ultra-thin fireproof coating material and its preparation method. The modified epoxy acrylate emulsion, as the substrate of the fireproof coating material, is obtained by modifying the surface of the organic-inorganic nano-$SiO_2$ and then successfully grating it to the poly-epoxy acrylate to get the organic and inorganic composite emulsion. Then, microencapsulated ammonium polyphosphates are added in as expanding agents to test optimal values of the adhesion strength, volume expansion rate, and temperature resistance time, which turn out to be 0.56 MPa, 2400% and 152 min respectively and superior to those of the existing technologies. The patent CN111218136A has disclosed a kind of organic-inorganic hybrid flame-retardant coating and its preparation method. Using inorganic silicates as the main raw material and vinyl acetate-vinyl copolymer emulsion as the base material, the flame-retardant coating obtained features high temperature resistance, good water resistance, high fire rating, fast drying, and so on.

Although the above strategies all can make the substrate effectively flame-retardant, there are still problems as follows: the halogen hydride, a poisonous and harmful gas, will be emitted in the combustion process of halogen flame retardants, which will pose a great threat to human health and the natural environment; to meet the high fire-retardant requirements, inorganic flame retardants need be added in large amount, which will greatly affect the mechanical properties of the adhesives and also increase the processing difficulty; and the development of organic-inorganic hybrid flame-retardant is a promising direction in flame-retardant field, but few researches are available on its application in the field of adhesives, which cannot provide an effective reference.

At present, there are few adhesives made for high-polymer materials that have effective adhesion; besides, many high-polymer materials have difficulty in adhesion due to low surface energy or less active groups, which restricts their further development and application in some key situations. Typical examples include polyethylene, EPDM rubber, and polyimide, etc. Polyethylene has difficulty in achieving the desired adhesion strength due to its lack of active groups on the molecular chain, high crystallinity, low surface energy and other reasons. Recently, an adhesive obtained by chemically initiated grafting method can achieve the maximum adhesive strength of 17 kg/cm². The EPDM rubber has the highest adhesion strength of only 2.13 N/mm at present according to the report due to its non-polarity, low cohesive energy, poor self-adhesion and mutual adhesion. Due to features of smooth surface and low surface chemical activity, polyimide films have to be subject to surface treatment or modification to improve their adhesion performance. The highest adhesion strength reported so far is only 1.5 kgf/cm. This shows that the high adhesion strength of high-polymer materials has become an urgent demand.

To sum up, it is urgent to develop an adhesive with excellent flame-retardant performance and good adhesion to high-polymer materials.

DESCRIPTION OF THE INVENTION

In view of the current situation of poor surface adhesion performance of high-polymer materials and poor flame retardance of adhesives in the existing technology, this invention provides a highly flame-retardant adhesive for high polymer materials. The phenolic hydroxyl flame-retardant in this invention is prepared from organic amino compounds by the one-step reaction, which has simple and controllable synthesis conditions and high synthesis efficiency; and the highly flame-retardant adhesive can be obtained by blending the flame-retardant and the adhesive. The highly flame-retardant adhesive synthesized in the invention can either be directly used as an adhesive for polymer materials to produce high adhesion strength, or used as a basic formula and prepared into a composite adhesive through the addition of other fillers, or used as a primer agent to modify surfaces of polymer materials, so as to meet different needs on various special occasions.

BRIEF DESCRIPTION

This invention presents a highly flame-retardant adhesive for high-polymer materials. This adhesive is obtained by preparing the phenolic hydroxyl-containing flame-retardant from organic amino compounds in a one-step reaction and then blending the flame-retardant with the adhesive to get the highly flame-retardant adhesive. The highly flame-retardant adhesive prepared can either be directly used as an adhesive, or be used as a primer agent, or be used as a basic formula and added as a composite adhesive following other fillers, so as to meet the adhesion requirements on various special occasions.

DETAILED DESCRIPTION

The technical solution of the invention is as follows:

The preparation method of a new flame retardant, which comprises steps as follows:

Under the condition of the use of solvents, the new flame-retardant is obtained by blending organic amino compounds, organic compounds containing phosphorus-hydrogen bonds, and aldehyde (ketone) compounds containing at least one phenolic hydroxyl group in its molecular structure to initiate the one-step reaction. The reaction formula is shown in Formula (1):

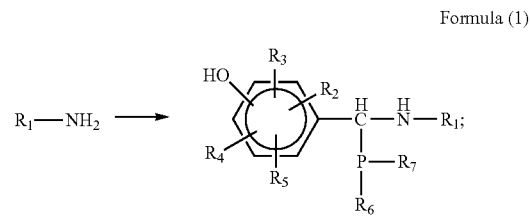

Formula (1)

In Formula (1), $R_2$ to $R_5$ can be organic groups of either hydrogen atoms or non-hydrogen atoms; $R_1$, $R_6$ and $R_7$ are organic groups of non-hydrogen atoms.

According to a preferred embodiment of the invention, the said organic amino compounds are organic compounds containing at least one amino group, including small-molecule amino compounds, linear amino polymers, comb-like amino macromolecules, amino dendrimers, and composite amino materials;

According to a further preferred embodiment of the invention, the said organic amino compounds are small molecule compounds containing several amino groups, linear polymers with amino groups in their side chains, and amino dendrimers;

According to a further preferred embodiment of the invention, the said organic amino compounds are ammonipropyl-terminated disiloxanes, fluorene ring compounds with amino as end groups, ethidene diamine, aminopropyl terminated polysiloxanes, polysiloxanes with aminopropyls on side chains, hexamethylenediamines, aminopropyltrimethoxysilanes, aminopropyl-vinyl-diethoxylsilane, aminopropyl-dimethyl-monoethoxysilane or aminopropyl-triethoxysilane.

According to a preferred embodiment of the invention, the said organic compounds containing phosphorus-hydrogen bonds are various phosphines that can be dissolved in the reaction system; according to a further preferred embodiment, the said phosphines are micromolecule phosphines and more preferred to be di-tert-butylphosphines, diphenylphosphine oxides, dibenzyl phosphites, dibutyl phosphites or 9, 10-dihydro-9-oxa-10-phosphenanthrene-10-oxides (DOPO).

According to a preferred embodiment of the invention, the said aldehyde (ketone) compound containing at least one phenolic hydroxyl group in its molecular structure is an organic compound containing at least two phenolic hydroxyl groups in its molecular structure, which is further preferred to be all kinds of unitary phenolic (ketone) compounds, binary phenolic (ketone) compounds, and ternary phenolic (ketone) compounds and more preferred to be p-hydroxy benzaldehydes, 3,4-dihydroxy benzaldehydes, 2,4-dihydroxy benzaldehydes or phloroglucinol carboxaldehydes.

According to a preferred embodiment of the invention, the said solvents are various polar and non-polar solvents that can dissolve reactants without chemically reacting with them, which are further preferred to be methylbenzene, tetrahydrofuran, chloroform, methyl alcohol, ethyl alcohol, diphenyl ether, dimethyl sulfoxide, and N,N-dimethylformamide and more preferred to be ethyl alcohol and chloroform.

According to a preferred embodiment of the invention, the said organic amino compounds, organic compounds containing phosphorus-hydrogen bonds and aldehyde (ketone) compounds containing at least one phenolic hydroxyl group in the molecular structure have a mole ratio of 1:(0.1-15):(0.1-20), which is further preferred to be 1:(2-15):(1-10).

According to a preferred embodiment of the invention, the said organic amino compounds, organic compounds containing phosphorus-hydrogen bonds and aldehyde (ketone) compounds containing at least one phenolic hydroxyl group in the molecular structure react at the temperature of 30-180° C., which is further preferred to be 50-80° C.

According to a preferred embodiment of the invention, the said organic amino compounds, organic compounds containing phosphorus-hydrogen bonds and aldehyde (ketone) compounds containing at least one phenolic hydroxyl group in the molecular structure react for 1-60 h.

According to the invention, a highly flame-retardant adhesive for high polymer materials is also presented, which consists of base adhesive, filler and the said new flame retardant in parts by mass as follows: 100 parts of base adhesive, 0-50 parts of filler, and 1-10 parts of new flame retardant.

According to a preferred embodiment of the invention, the said base adhesive indicates a variety of adhesives that can play an adhesion role on high-polymer materials, which is further preferred to be epoxy adhesive, phenol aldehyde resin adhesive, isocyanate adhesive, or benzoxazine adhesive, and more preferred to be benzoxazine adhesive.

According to a preferred embodiment of the invention, the said filler indicates a variety of auxiliaries that can improve the strength and adhesion properties of the adhesives, which is further preferred to be fumed silica, precipitated silica, carbon black, calcium carbonate, aluminum hydroxide and/or magnesium hydrate and any of the above compounds specially treated and more preferred to be silazane-treated silica. 0-50 parts of filler is used, which is preferred to be 0-30 parts. When 0 part of filler is used, the adhesive composition may contain no filler.

According to the invention, the said highly flame-retardant adhesive for high-polymer materials can either be used directly as an adhesive or be used together with various catalysts and auxiliaries. According to a preferred embodiment of the invention, the said auxiliaries are heat-oxygen stabilizers, conductive agents, foaming agents, deep curing agents, pigments and plasticizers, etc. and added in the amount of 1-10 parts by mass. According to a preferred embodiment of the invention, the said catalysts are acetic acid and shall be added in the amount of 1-5 parts by mass.

According to a preferred embodiment of the invention, when catalyst, filler and auxiliary are added and used together, the base adhesive is used as the basic formula and is to be mixed with the catalyst, the filler and the flame retardant evenly; then, the mixture is placed at the interface of the adhesive and subject to the programmed heating to achieve good adhesion.

Those not detailed in the invention shall be subject to the existing arts.

The principle and beneficial effects of the invention are as follows:

The reaction route in this invention can introduce the benzene ring, nitrogen element and phosphorus element into the same flame-retardant molecular structure cleverly so that the synergistic effect of nitrogen, phosphorus and silicon is formed when the flame-retardant is burned, thus playing a good flame-retardant role; as the phenolic hydroxyl group contained in the molecular structure can get involved in the adhesion process of the base adhesive to high polymer materials, it is especially suitable to the surface treatment of polymer materials and other materials which are difficult to adhere, which has obtained remarkable results.

The synthesis process of the flame-retardant in the invention is a one-step reaction. The use of the reaction solvent contributes to the blending of reaction materials and the improvement of the reaction efficiency. Considering the polarity, stability and safety of solvents, ethyl alcohol and chloroform are preferred.

The highly flame-retardant adhesive for high-polymer materials prepared in the invention can either be used directly as an adhesive, or used as a primer agent, or used as an adhesive after being mixed with other substances. The mixture of it with various additives, including fillers and auxiliaries, can greatly improve the comprehensive properties of the adhesive, so as to meet the adhesion requirements on various occasions. Examples are as follows:

The use of various fillers, especially reinforcing fillers, can better improve the mechanical properties of the adhesive. As the formula used in the invention contains phenolic hydroxyl groups, it shows characteristics of fast filler absorption, good compatibility and reinforcing efficiency for all kinds of inorganic fillers and organic polar fillers. To further improve the high-temperature use performance of the adhesive, the invention further prefers white carbon blacks treated with phenyl compounds for reinforcement to reduce the softening and thermal degradation phenomena in high-temperature use.

The addition of various auxiliaries, such as heat-oxygen stabilizers, conductive agents, foaming agents, deep curing agents, pigments, and plasticizers, etc., in the formula of the invention can further improve the performance of the adhesive and expand its applications. Some auxiliaries can play various roles; for example, the iron oxide red can also play the roles of heat-oxygen stabilizer, pigment and reinforcing filler. The addition of special polymers can improve the wetting performance of this adhesive on a specific interface. The addition of special coupling agents can improve the adhesion performance of this adhesive on a special interface. In a word, by changing the use amount of auxiliaries and using various auxiliaries together, high-performance adhesives can be prepared to meet the needs of various occasions, enabling the invention to have broad application prospects and good market prospects.

DETAILED EMBODIMENTS

The invention is further described in combination with Embodiments as follows, but is not limited to that.

All raw materials used in the embodiments are conventional raw materials available on the market or synthesized according to the methods in the references.

The said mole ratios in the embodiments are ratios of substance quantities and the said portion ratios are mass ratios.

Embodiment 1

Mix the aminopropyl terminated disiloxane, phloroglucinol carboxaldehyde and di-tert-butylphosphine into the chloroform uniformly by the mole ratio of 1:10:4 and magnetically stir the mixture for 6 hours while maintaining the temperature at 80° C. Purify the mixture to get the phenolic hydroxyl flame retardant, with a yield of 85%.

Embodiment 2

As described in Embodiment 1, with the following differences: change aminopropyl terminated disiloxane to a fluorene ring compound with amino as end groups, di-tert-butylphosphine to DOPO, phloroglucinol carboxaldehyde to p-hydroxy benzaldehyde and the mole ratio to 1:2:2. Change the reaction temperature to 70° C. and the duration of magnetic stirring to 5 hours to get the flame-retardant with phenolic hydroxyl groups at both ends, with a reaction yield of 97%, and denote it as DFD.

Figure 1:
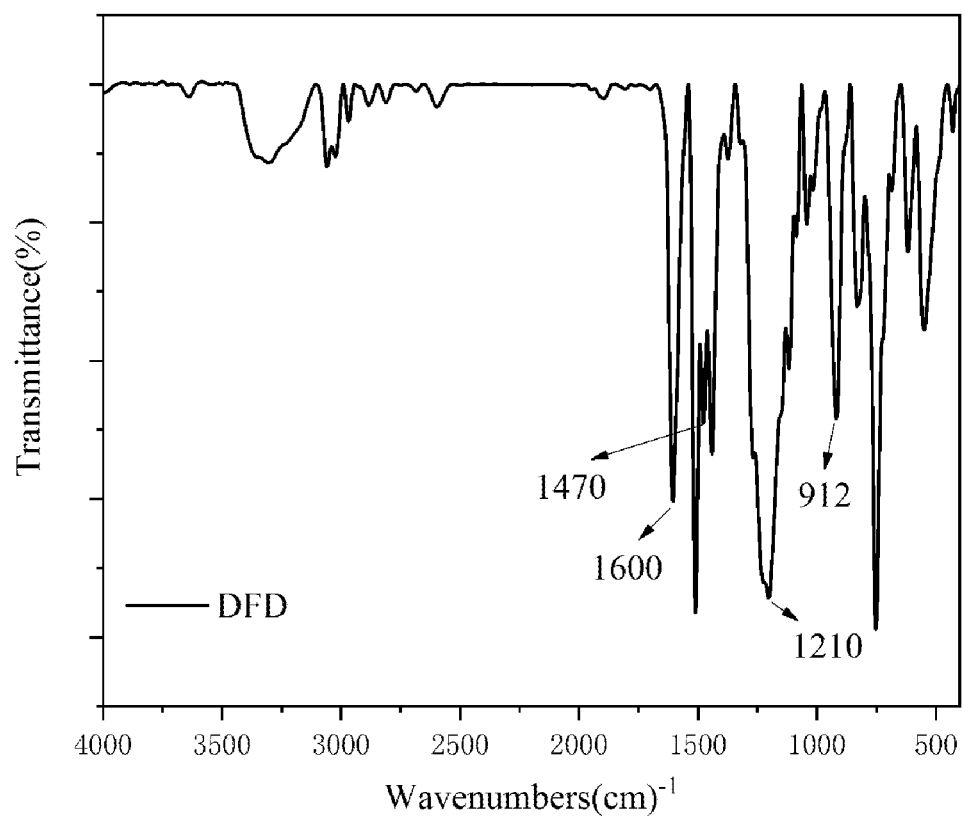
FIG. 1 is the infrared spectrogram of the flame retardant containing phenolic hydroxyl groups synthesized in Embodiment 2.
Figure 2:
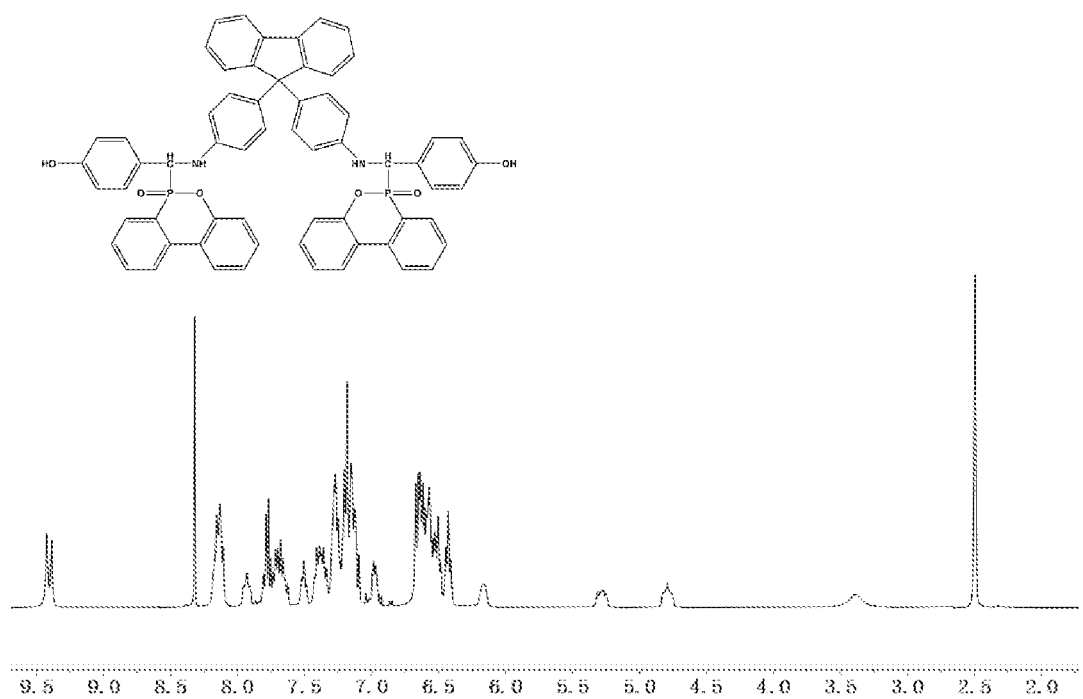
FIG. 2 is the hydrogen nuclear magnetic resonance spectrogram of the flame retardant containing phenolic hydroxyl groups synthesized in Embodiment 2.

The IR characterization of the phenolic hydroxyl flame-retardant synthesized in this embodiment is shown in FIG. 1. As can be seen from FIG. 1, the peak at 912 $cm^{-1}$ is the infrared absorption peak of the benzene ring unsaturated carbon, and the peak at 1210 $cm^{-1}$ is the stretching vibration peak of C—N;

The NMR characterization of the phenolic hydroxyl flame-retardant synthesized in this embodiment is shown in FIG. 2: $^1$HNMR (DMSO-$d_6$): δ (ppm) 3.38 (s, $H_2O$), 4.78 (s, 2H, -ph-CH—NH—), 5.28 (s, 2H, —CH—NH-ph), 6.11-8.22 (8H, Ar—H), 9.38 (s, 2H, —OH).

The reaction process of the flame-retardant with phenolic hydroxyl groups at both ends obtained in this embodiment is shown in Formula (2):

Formula (2)

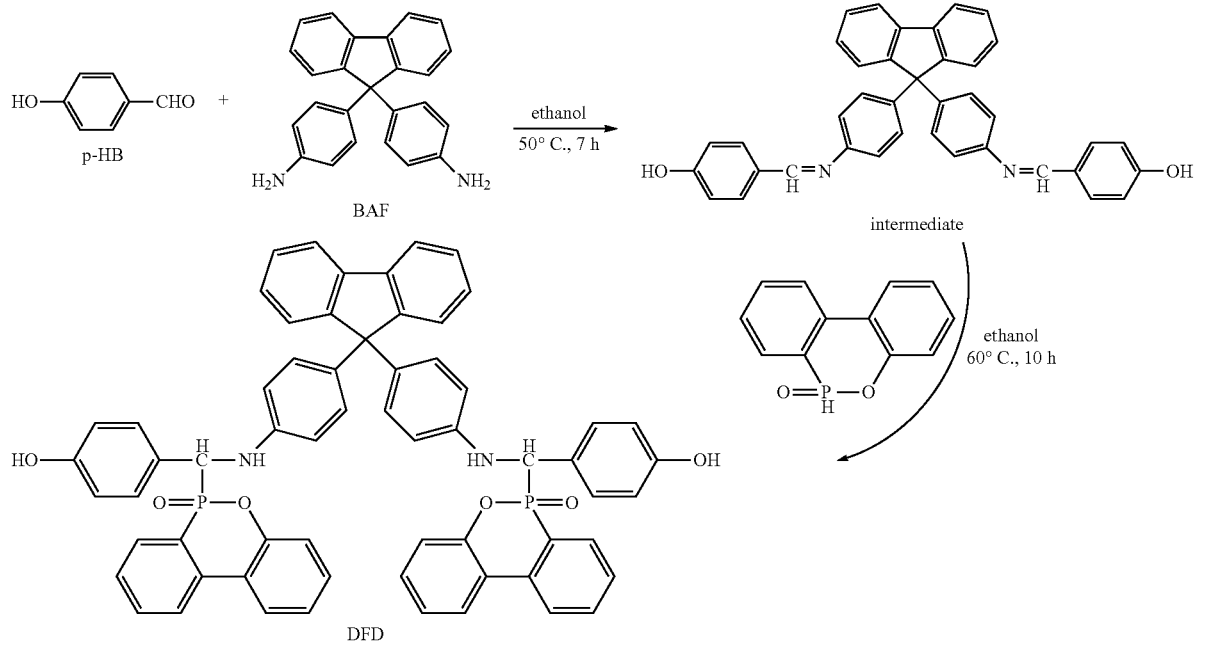

Embodiment 3

As described in Embodiment 2, with the following differences: change fluorene ring compound with amino as end groups to ethanediamine and remain other parameters the same to get a flame retardant with phenolic hydroxyl groups at both ends, with a reaction yield of 100%.

Embodiment 4

As described in Embodiment 3, with the following differences: change ethanediamine to aminopropyl terminated polysiloxane (with the number-average molar mass of 10000) to get a flame retardant with phenolic hydroxyl groups at both ends, with a reaction yield of 100%.

Embodiment 5

As described in Embodiment 3, with the following differences: change ethanediamine to polysiloxane with aminopropyls on side chains (the chain link content of aminopropyls in the polysiloxane is 5%, with the number-average molar mass of 120000) to get polysiloxane with phenolic hydroxyl groups on side chains finally, with a reaction yield of 90%.

Embodiment 6

As described in Embodiment 3, with the following differences: change ethanediamine to hexamethylenediamine to get a flame retardant with phenolic hydroxyl groups at both ends of the molecule, with a reaction yield of 96%.

Embodiment 7

As described in Embodiment 6, with the following differences: change hexamethylenediamine to aminopropyltrimethoxysilane to get a flame retardant with phenolic hydroxyl groups at one end, with a reaction yield of 96%.

Embodiment 8

As described in Embodiment 7, with the following differences: change aminopropyltrimethoxysilane to aminopropyl-vinyl-diethoxylsilane to get a flame retardant with vinyl-diethoxylsilane at one end, with a reaction yield of 98%.

Embodiment 9

As described in Embodiment 8, with the following differences: change aminopropyl-vinyl-diethoxylsilane to aminopropyl-dimethyl-monoethoxysilane, DOPO to 3, 4-dihydroxy benzaldehyde and the solvent to tetrahydrofuran. The product is a dimethyl-monoethoxysilane flame retardant with phenolic hydroxyl groups at one end, with a reaction yield of 95%.

Embodiment 10

As described in Embodiment 8, with the following differences: change aminopropyl-vinyl-diethoxylsilane to aminopropyl-dimethyl-monoethoxysilane, DOPO to 2, 4-dihydroxy benzaldehyde and the solvent to methylbenzene. The product is a dimethyl-monoethoxysilane flame retardant with phenolic hydroxyl groups at one end, with a reaction yield of 93%.

Embodiment 11

As described in Embodiment 8, with the following differences: change aminopropyl-vinyl-diethoxylsilane to aminopropyl-triethoxysilane, p-hydroxyl-benzophenone to salicylaldehyde and the solvent to chloroform. The product is triethoxysilane containing benzoxazine groups, with a reaction yield of 96%.

Embodiment 12

As described in Embodiment 3, with the following differences: add acetic acid as a catalyst for the reaction whose amount is 5% of that of the ethanediamine. The reaction lasts for 3 hours. The product is a flame retardant with phenolic hydroxyl groups at both ends, with a reaction yield of 94%.

Embodiment 13

Add the flame retardant with phenolic hydroxyl groups at both ends obtained in Embodiment 2 into 100 parts of base adhesive by parts of 2, 4, 6, and 8 respectively, and the said base adhesive is benzoxazine adhesive (denoted as G1). Coat the mixtures on high polymer material plates and carry out thermo-curing at certain conditions (the curing conditions are heating at 80° C., 90° C., 100° C. and 120° C. for 2 h, respectively). Place the plates for 1 day after curing to get flame-retardant adhesives denoted as G1-DFD-2, G1-DFD-4, G1-DFD-6 and G1-DFD-8, respectively. Then, determine their properties with a tensile machine.

Embodiment 14

Taking the adhesives added with flame retardant prepared in Embodiment 13 as the basic formula (100 parts), add 5 parts of fumed silica and 1 part of iron oxide red and mix them evenly; coat the mixtures on high polymer material plates and carry out thermo-curing at certain conditions (the curing conditions are heating at 80° C., 90° C., 100° C. and 120° C. for 2 h, respectively). Place the plates for 1 day after curing. Then, determine their properties with a tensile machine.

Embodiment 15

Coat the adhesives added with flame retardant obtained in Embodiment 13 on high polymer material plates and carry out thermo-curing at certain conditions (the curing conditions are heating at 120° C., 140° C. and 160° C. for 2 h, respectively). Place the plates for 1 day after curing. Then, determine their properties with a tensile machine.

Embodiment 16

Taking the adhesives added with flame retardant obtained in Embodiment 13 as the basic formula, add acetic acid, silazane treated M-5 type white carbon black (15 parts) and silane coupling agent KH570 (3 parts) and mix them evenly; coat the mixtures on steel plates evenly and carry out thermo-curing at certain conditions (the curing conditions are heating at 80° C., 90° C., 100° C. and 120° C. for 2 h, respectively). Place the plates for 1 day after curing. Then, determine their properties with a tensile machine.

Test Example 1

Test the adhesion strength of the adhesives prepared in Embodiments 13, 14 and 16. The data results are shown in Table 1.

TABLE 1

| S/N | Adhesion strength MPa | | | |
|---|---|---|---|---|
| | 1 | 2 | 3 | Average value |
| Embodiment 13 G1-DFD-8 | 4.34 | 4.42 | 4.83 | 4.53 |
| Embodiment 14 | 4.18 | 4.29 | 4.25 | 4.24 |
| Embodiment 16 | 4.22 | 4.26 | 4.42 | 4.30 |
| Comparative Example 1* | — | — | — | 4.30 |

*Note:
the data of the Comparative Example 1 is cited from the patent numbered CN109880541A.

Test Example 2

Test the products in Embodiment 13 with a micro calorimeter to get the data. The results are shown in Table 2 and FIG. 3.

TABLE 2

| S/N | pHRR/Wg$^{-1a}$ | THR/KJg$^{-1b}$ | HRC/Jg$^{-1}$K$^{-1c}$ |
|---|---|---|---|
| G1 | 99.01 | 25.4 | 112 |
| G1-DFD-2 | 97.15 | 23.1 | 109 |
| G1-DFD-4 | 86.59 | 20.6 | 97 |
| G1-DFD-6 | 78.43 | 20.8 | 89 |
| G1-DFD-8 | 73.69 | 19.8 | 83 |
| Comparative Example 2* | 102 | 4.6 | 118 |

*Note:
the data of Comparative Example 2 is cited from the literature (DOI: 10.1016/j.j aap.2011.01.012).

Test Example 3

Test the products in Embodiment 13 to get the thermal stability data. The results are shown in Table 3 and FIG. 4.

TABLE 3

| | T5% (° C.) | T10% (° C.) | Char yield (%) |
|---|---|---|---|
| G1 | 238 | 274 | 52.1 |
| G1-DFD-2 | 245 | 276 | 52.4 |
| G1-DFD-4 | 251 | 289 | 52.8 |
| G1-DFD-6 | 237 | 284 | 54.2 |
| G1-DFD-8 | 242 | 281 | 48.1 |
| Comparative Example 3* | 283 | — | 45 |

*Note:
the data of Comparative Example 3 is cited from the patent numbered CN101220152A.

As can be seen from Table 1, the highly flame-retardant adhesive prepared in the invention can be used as an adhesive directly and has high strength; the highly flame-retardant adhesive still has good performance after being mixed with other fillers and auxiliaries, and its overall adhesion strength is even higher than the tensile strength data of coatings for high-polymer materials reported in the literature. The data shows that the adhesive in the invention has obvious superiority in performance, which further demonstrates the creativity of the invention, combining with the superiority in the preparation technology of the invention as said above.

Figure 3:
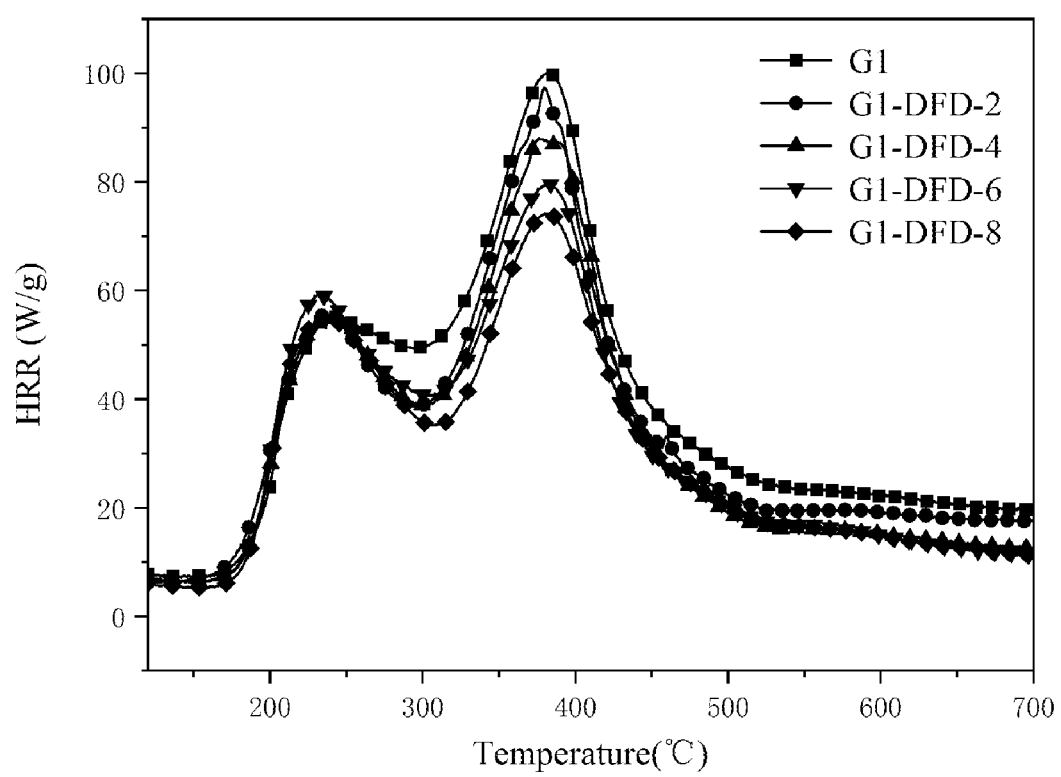
FIG. 3 shows the data curves of the adhesives with different compositions as tested by a micro calorimeter in Test Example 13.
Figure 4:
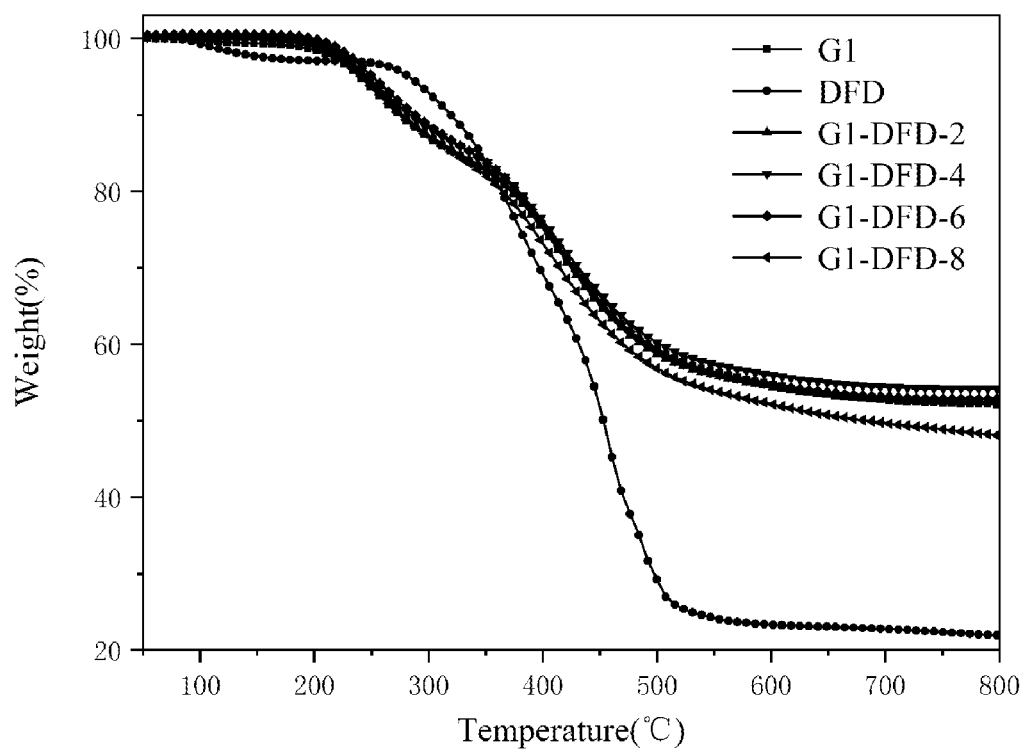
FIG. 4 shows the TGA data curves of adhesives with different compositions in Test Example 13.

Table 2, FIG. 3, Table 3 and FIG. 4 prove that the flame-retardant adhesive in the invention has good flame retardance and carbon residue and the properties of the base adhesive are further optimized. It is a kind of highly flame-retardant adhesive that is highly applicable to high-polymer materials.

What is claimed is:

1. A flame-retardant adhesive for polymer materials comprising a base adhesive, a filler and a flame retardant; wherein the base adhesive, the filler and the flame retardant have a ratio of 100:0-50:1-10 by the weight; the flame-retardant has a structure as shown in chemical formula (1):

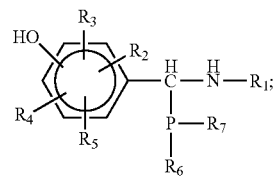

Chemical formula (1)

in the chemical formula (1), $R_2$ to $R_5$ are organic groups of either hydrogen atoms or non-hydrogen atoms; $R_1$, $R_6$ and $R_7$ are organic groups of non-hydrogen atoms.

2. The flame-retardant adhesive for polymer materials according to claim 1, characterized in that the flame-retardant has a structure as follows:

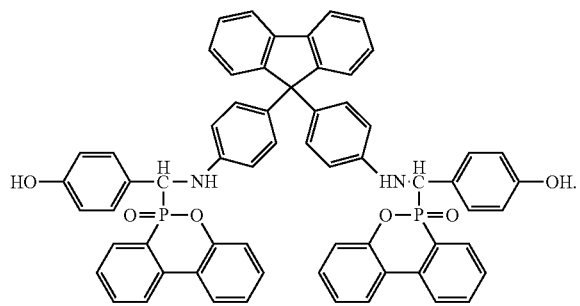 [SMILES: O=P1(C(Nc2ccc(C3(c4ccc(NC(c5ccc(O)cc5)P5(=O)Oc6ccccc6-c6ccccc65)cc4)c4ccccc4-c4ccccc43)cc2)c2ccc(O)cc2)Oc2ccccc2-c2ccccc21]

3. The flame-retardant adhesive for polymer materials according to claim 1, characterized in that the base adhesive is selected from the group consisting of an epoxy adhesive, a phenol aldehyde resin adhesive, an isocyanate adhesive and a benzoxazine adhesive.

4. The flame-retardant adhesive for polymer materials according to claim 1, characterized in that the filler is selected from the group consisting of a fumed silica, a precipitated silica, a carbon black, a calcium carbonate, an aluminum hydroxide, a magnesium hydrate and any of above compounds treated with a silazane.

5. The flame-retardant adhesive for polymer materials according to claim 4, characterized in that the filler is a silazane-treated white carbon black.

6. The flame-retardant adhesive for polymer materials according to claim 1, characterized in that the said flame-retardant adhesive further comprises auxiliaries; wherein the base adhesive, the filler, the flame retardant and the auxiliaries have a ratio of 100:0-50:1-10:1-10 by the weight.

7. The flame-retardant adhesive for polymer materials according to claim 6, characterized in that the auxiliaries are selected from the group consisting of heat-oxygen stabilizers, conductive agents, foaming agents, deep curing agents, pigments and plasticizers.

8. The flame-retardant adhesive for polymer materials according to claim 1, characterized in that the said flame-retardant adhesive further comprises a catalyst; wherein the base adhesive, the filler, the flame retardant and the catalyst have a ratio of 100:0-50:1-10:1-10 by the weight.

9. The flame-retardant adhesive for polymer materials according to claim 1, characterized in that the catalyst is acetic acid.

10. The flame-retardant adhesive for polymer materials according to claim 1, characterized in that the flame-retardant is prepared by the following method:
the flame-retardant is obtained by blending an organic amino compound, an organic compounds containing a phosphorus-hydrogen bond, and an aldehyde (ketone) compound containing at least one phenolic hydroxyl group in its molecular structure in a solvent;
the organic amino compounds is selected from the group consisting of a small-molecule amino compound, a linear amino polymer, a comb-like amino macromolecule, an amino dendrimer and a composite amino material.

11. The flame-retardant adhesive for polymer materials according to claim 10, characterized in that the organic amino compound is selected from the group consisting of an ammonipropyl-terminated disiloxane, a fluorene ring compounds with amino as end group, ethidene diamine, aminopropyl terminated polysiloxane, a polysiloxane with an aminopropyl on a side chain, a hexamethylenediamine, an aminopropyltrimethoxysilane, an aminopropyl-vinyl-diethoxylsilane, an aminopropyl-dimethyl-monoethoxysilane and an aminopropyl-triethoxysilane;
the organic compounds containing a phosphorus-hydrogen bond is selected from the group consisting of a di-tert-butylphosphine, a diphenylphosphine oxide, a dibenzyl phosphite, a dibutyl phosphite and a 9,10-dihydro-9-oxa-10-phosphenanthrene-10-oxide;
the aldehyde (ketone) compound containing at least one phenolic hydroxyl group in the molecular structure is selected from the group consisting of a p-hydroxy benzaldehyde, a 3,4-dihydroxy benzaldehyde, a 2,4-dihydroxy benzaldehyde and a phloroglucinol carboxaldehyde.

12. The flame-retardant adhesive for polymer materials according to claim 10, characterized in that the solvents is selected from the group consisting of methylbenzene, tetrahydrofuran, chloroform, methyl alcohol, ethyl alcohol, diphenyl ether, dimethyl sulfoxide and N,N-dimethylformamide.

13. The flame-retardant adhesive for polymer materials according to claim 10, characterized in that the organic amino compound, the organic compounds containing the phosphorus-hydrogen bond and the aldehyde (ketone) compound containing at least one phenolic hydroxyl group in the molecular structure have a mole ratio of 1:(0.1-15):(0.1-20).

14. The flame-retardant adhesive for polymer materials according to claim 10, characterized in that the said organic amino compound, the organic compound containing the phosphorus-hydrogen bond and the aldehyde (ketone) compound containing at least one phenolic hydroxyl group in the molecular structure react at the temperature of 30-180° C.

15. The flame-retardant adhesive for polymer materials according to claim 10, characterized in that the organic amino compound, the organic compound containing the phosphorus-hydrogen bond and the aldehyde (ketone) compound containing at least one phenolic hydroxyl group in the molecular structure react for 1-60 hours.

* * * * *